United States Patent
Willets et al.

(10) Patent No.: US 7,629,707 B2
(45) Date of Patent: Dec. 8, 2009

(54) POWER SYSTEM WITH HYDROGEN ON DEMAND

(75) Inventors: Julie A. Willets, Overland Park, KS (US); Jerry D. Meyers, Olathe, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 765 days.

(21) Appl. No.: 11/153,806

(22) Filed: Jun. 15, 2005

(65) Prior Publication Data

US 2006/0286416 A1   Dec. 21, 2006

(51) Int. Cl.
*H02J 7/00* (2006.01)
(52) U.S. Cl. .......................................... 307/66; 60/773
(58) Field of Classification Search ............. 307/64–66; 60/39.281, 773, 793
See application file for complete search history.

(56) References Cited

U.S. PATENT DOCUMENTS

| | | |
|---|---|---|
| 4,119,861 A | 10/1978 | Gocho |
| 5,760,488 A | 6/1998 | Sonntag |
| 5,767,584 A | 6/1998 | Gore et al. |
| 6,011,324 A | 1/2000 | Kohlstruck et al. |
| 6,380,637 B1 | 4/2002 | Hsu et al. |
| 6,389,841 B1 | 5/2002 | Feldman, Jr. et al. |
| 6,452,289 B1 | 9/2002 | Lansberry et al. |
| 6,498,462 B2 | 12/2002 | Ballantine et al. |
| 6,522,955 B1 | 2/2003 | Colborn |
| 6,649,289 B2 | 11/2003 | Hsu et al. |
| 6,841,893 B2 | 1/2005 | Maiwald et al. |
| 6,879,052 B1 | 4/2005 | Johnson |
| 6,885,112 B2 | 4/2005 | Johnson |
| 7,060,379 B2 * | 6/2006 | Speranza et al. ............... 429/9 |
| 7,119,458 B2 * | 10/2006 | Barnes et al. ................. 307/65 |
| 7,250,231 B2 * | 7/2007 | Edlund ......................... 429/23 |
| 7,307,360 B2 * | 12/2007 | Gonzales et al. ............. 307/64 |
| 2004/0094963 A1 | 5/2004 | Johnson |
| 2004/0095022 A1 | 5/2004 | Johnson |

FOREIGN PATENT DOCUMENTS

| | | |
|---|---|---|
| EP | 0 595 191 A | 5/1994 |
| WO | 99/32762 | 7/1999 |

OTHER PUBLICATIONS

Yutaka, Kuwata, "Multifuel Fuel-Cell Energy System for Telecommunications Cogeneration System," Iece Trans Commun., vol. El B., No. 11, Nov. 1998.
Noboru Asano, "The Future of Our Fuel Cell Total Energy System," NTT Review, Mar. 1994, vol. 6, pp. 47-53.
"A High-Availability Backup Source of Energy", J.C. Chigolet et al. Sep. 27, 1993.
"Advances promise high cycle life, commercial viability for electric vehicles," Dept. Of Energy, U.S.A., April (Imps).
Wu, Ying Dr., "Process for the Regeneration of Sodium Borate to Sodium Borohydride for Use as a Hydrogen Storage Source (New FY 2004 Project)," FY 2003 Progress Report, Millennium Cell, Inc.
Szary, Patrick J. and Dr. Ali Maher, "PEM Fuel Cell Integration With a Hydrogen Generator on a Bench," Final Report Jun. 2001, FHWA-NJ-Mar. 2003, New Jersey Department of Transportation.

* cited by examiner

*Primary Examiner*—Albert W Paladini

(57) ABSTRACT

The present invention is a power system using a reformer/fuel cell arrangement as the primary source of DC power. The reformer is operated on either natural gas or propane. A backup source of power consumes hydrogen which is diffused from a solid medium. On an as-needed basis, the medium is reacted to release hydrogen gas which is consumed by a fuel cell to generate backup DC power. The system also includes Lithium-Metal-Polymer batteries which are used for both bridging and backup purposes.

15 Claims, 2 Drawing Sheets

POWER SYSTEM WITH HYDROGEN ON DEMAND

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention relates to the field of providing reliable power. More specifically, the field of maintaining DC power to telecommunications equipment.

BACKGROUND OF THE INVENTION

Traditionally, AC power from a commercial utility has been used as a primary source of electrical power. Telecommunications power systems have included backup power arrangements which attempt to ensure continued power in the event of black-outs and other disturbances in the commercial power grid. To accomplish this, a diesel generator is often used as a backup power source and is backed up by an array of valve-regulated lead-acid (VRLA) batteries.

These conventional systems, however, have their limitations. For one, they are dependant on commercial electrical power and thus, cannot be used in remote locations which do not have access to the AC power grid. This limitation has left much of the globe without telecommunications services.

The diesel generators used have also created problems. This is because they are noisy and emit harmful exhausts, e.g., carbon monoxide. These operational characteristics preclude their use indoors and make it undesirable to locate the diesel generator near occupied areas.

The VRLA batteries incorporated into the conventional systems have also proved to be problematic. First of all, they require considerable space. Additionally, they produce harmful and corrosive gases and, thus, require ventilation. Further, they are difficult to dispose of because of environmental problems. And they also have a short life spans and must be replaced every few years. Finally, they are not suitable for extremely hot or cold environments, thus, they must be kept in climate-controlled environments.

SUMMARY OF THE INVENTION

The present invention comprises a system which overcomes the disadvantages in the prior art systems by using a system for providing electrical power. The system comprises a gas-extraction device, e.g., a reformer, for extracting a first source of gas, e.g., hydrogen, from a fuel such as propane or natural gas. Also included is a device which noncombustibly consumes the gas extracted to create a primary source of electrical power.

A backup supply of energy is also generated using a fuel cell. This fuel cell, however, is fueled using a gas, e.g., hydrogen, which is stored in a medium. In the preferred embodiment this is a solid medium. The hydrogen stored, when needed, is released by reacting the medium (e.g., with an aqueous solution). The hydrogen is then consumed by a second fuel cell thus creating a backup supply of electrical power.

An array of Lithium-Metal-Polymer (LMP) batteries is also provided to serve as a backup source, but also to bridge between switches between the primary and backup energy supplies.

BRIEF DESCRIPTION OF THE DRAWINGS

The present invention is described in detail below with reference to the attached drawing figures, wherein.

DETAILED DESCRIPTION OF THE INVENTION

The present invention has numerous advantages over conventional power systems. It is compact, efficient, reliable, and may be operated without connecting the system into the commercial electrical power grid or into a natural gas pipeline utility. This makes the system transportable to remote locations—locations in which telecommunications services (e.g., wireless) are presently unavailable.

Figure 1:
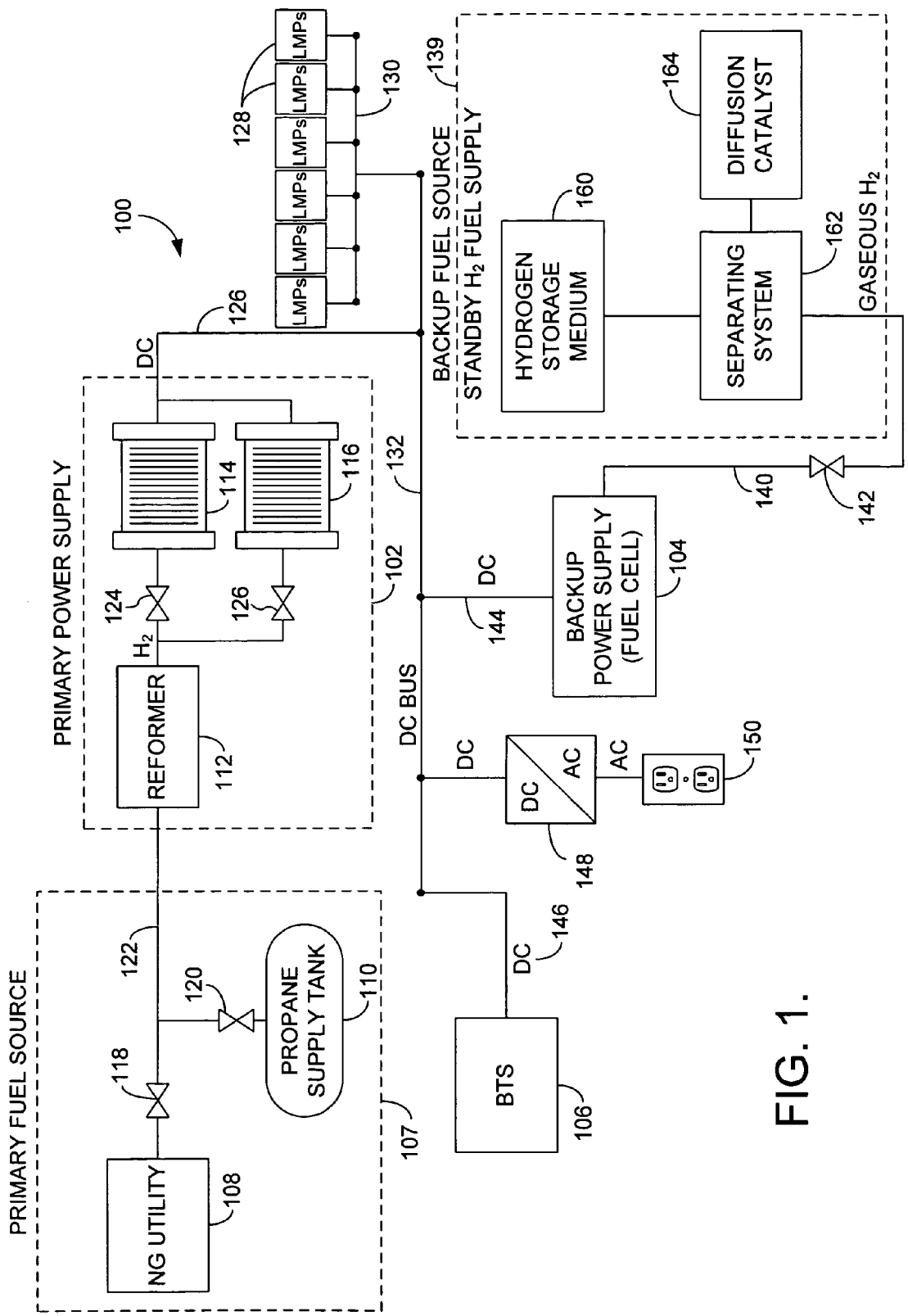
FIG. 1 is a schematic showing how the components of the present invention are functionally interconnected and thus operate together.
Figure 2:
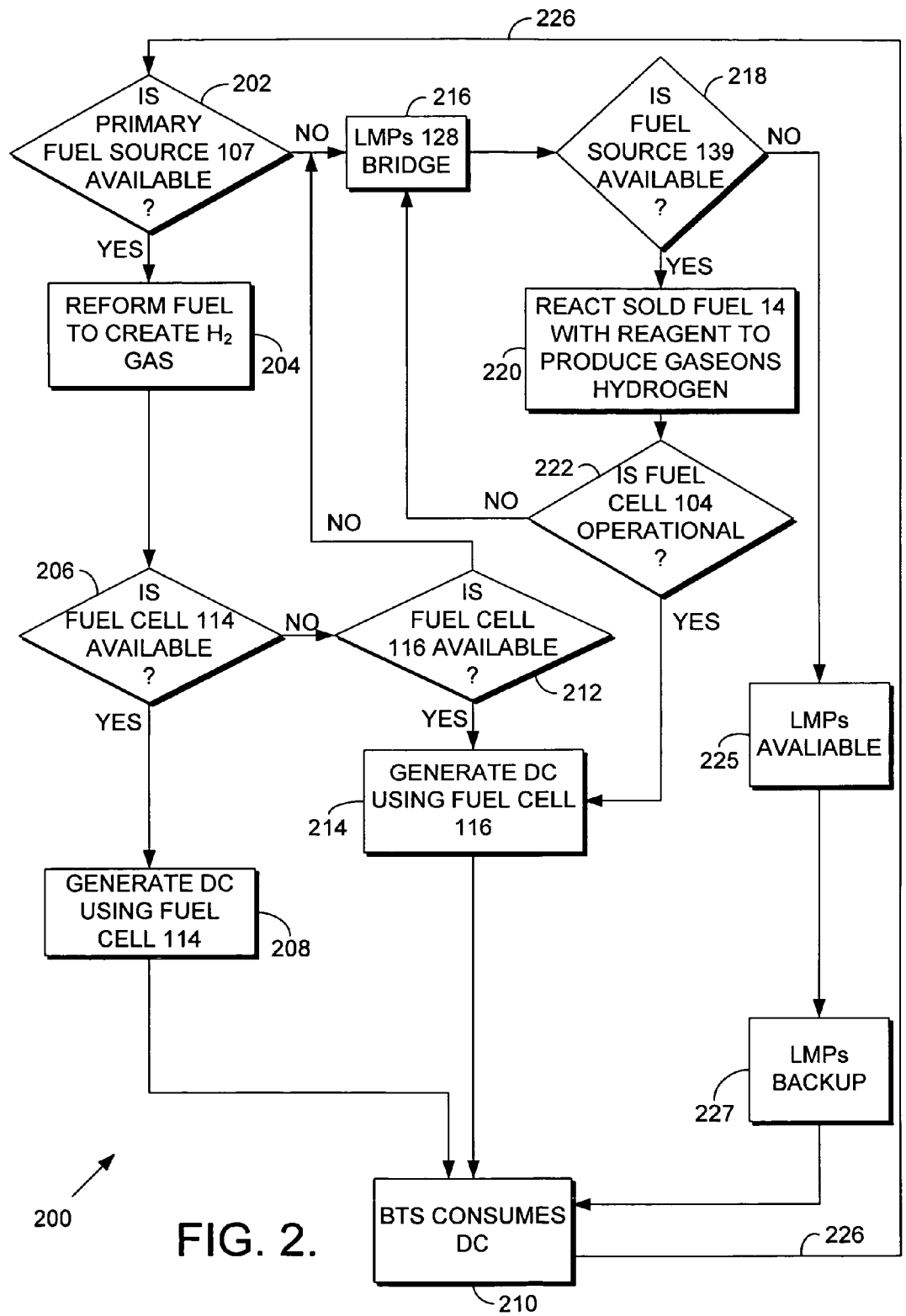
FIG. 2 is a flow chart showing the energy-management processes of the present invention.

One embodiment of the present invention is disclosed in FIG. 1 and the flow chart of FIG. 2. Looking first to FIG. 1, we see a schematic representation of a power system 100. System 100 includes a primary power supply 102 and a backup power supply 104. These two supplies are used to ensure that DC power is maintained to the power-distribution unit (not shown) for a base transceiver station (BTS) 106. BTS 106 is the radio-hardware portion of a cellular base station. It is involved in the transmission and receiving of voice and data. Power distribution units comprise the electrical equipment for making the necessary connections into the telecommunication cell-site equipment.

It should be understood that it is important that power is not lost to the BTS—even temporarily. Failures could irrevocably damage customer relations. Customers are becoming increasingly dependent on telecommunications systems to handle important matters, e.g., financial transactions.

The system and processes here reduce the possibilities for failure. This is done by maintaining constant DC power in a DC bus 132 into which BTS 106 is electrically connected via a line 146. In normal operation, primary source 102 provides DC power into bus 132. DC power is continually consumed by BTS 106. Reliability is accomplished using the disclosed system and methods which provide backup contingencies to accommodate situations where the primary power supply 102 fails.

Primary power supply 102 operates using a primary fuel source 107. Primary fuel source 107 comprises two optional fuel sources. The first is natural gas from a utility 108. Use of this source requires availability to natural gas service. This may or may not be possible, but the system is not natural-gas dependent.

If natural gas is not available, the system is able to alternatively use propane or stored high-pressure natural gas. Propane is maintained on site in a propane supply tank 110. Propane may be transported in tanks, but more typical is that tank 110 is located and filled on site by a tanker truck or by other means. Propane may be the only option in locations in which natural gas is not available. For example, in the South-American rainforest natural gas from a utility is not available and in these remote areas, the system would likely only include the propane component 110.

Because the system is completely untied to any physically connected utility, it may be used to offer cell service to locations and people who have never had access to cell service before. Propane is deliverable almost anywhere. Thus, cell towers are freed from geographic bondage caused by the need for utility connectivity.

If natural gas is available, however, both options will exist. Thus, the operator is able to choose between natural gas source 108 or propane source 110 or even bottled high-pressure natural gas depending on cost.

Regardless of whether natural gas or propane is used, fuel from source 107 is consumed by a hydrogen reformer 112. Hydrogen reformers are devices which extract the hydrogen contained in fuels. This extraction is accomplished by catalytic reaction which separates the hydrogen from the carbon in the fuel, then mixes the carbon to form carbon dioxide. The carbon dioxide is then released into the atmosphere. The hydrogen extracted may then be consumed by a fuel cell to produce DC power.

Reformer 112 in FIG. 1 is used to supply one of two fuel cells, a first fuel cell 114 and a spare fuel cell 116. Ordinarily, only first fuel cell 114 is operational. Spare fuel cell 116 is called into action only if fuel cell 114 fails, or needs to be taken off line, e.g., for maintenance. When necessary, switching between fuel cells 114 and 116 is easily accomplished using valves 124 and 126. In ordinary operation, valve 124 will be open and valve 126 will be closed. This causes the hydrogen extracted by reformer 112 to be consumed by fuel cell 114. If fuel cell 114 becomes unavailable, an operator or an automated system will cause valve 124 to close and valve 126 to open. This will cause the hydrogen to be consumed by spare fuel cell 116.

Fuel cells are electrochemical energy-conversion devices. They utilize hydrogen and oxygen. Most fuel cells include proton-exchange membranes (PEMs) or other equivalent devices. PEMs cause the electron from hydrogen to be removed temporarily. Later, this hydrogen electron is returned when the hydrogen is combined with the oxygen to produce water. This creates electricity. The reaction is entirely noncombustive and generates DC electrical power. Because the only by-products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, fuel cells 114 and 116 each include at least one proton-exchange membrane (PEM). Most fuel cells include a plurality of PEMs. Though fuel cells 114 and 116 use PEMs, other fuel-cell technologies exist which might be used and still fall within the scope of the present invention. One example of a PEM-type fuel cell which is suitable for use with the present invention is the modular, cartridge-based, proton-exchange membrane I-1000 power module manufactured by Reli-On, Inc. of Spokane, Wash.

The DC outputs of both fuel cells 114 and 116 are received into electrical line 126 which is connected into DC bus 132. Only one of the fuel cells, however, will produce DC output at a given time depending on the current status of valves 124 and 126. From bus 132, the DC output from the fuel cell in use (either fuel cell 114 or fuel cell 116) serves as the primary provider of DC power in the system.

The system also includes a plurality of LMP batteries 128 which are used for bridging and backup purposes. LMPs have an anode made of lithium and an organic electrolyte with no water. Though LMPs have been used in the preferred embodiment, other energy storage devices, and other kinds of lithium-batteries might be used as well and still fall within the scope of the present invention. Lithium-ion batteries are comprised of a carbon anode, a metal oxide cathode, and an electrolyte which is a lithium salt in an organic solvent. Other kinds of batteries, e.g., nickel-cadmium might work as well and would also fall within the scope of some embodiments of the present invention.

LMP batteries provide several key advantages over other battery architectures such as valve-regulated lead-acid (VRLA) batteries, and other known battery sources, in that they operate in high or low ambient temperatures (−40° F. to +149° F.) without the need for external heating or cooling requirements. A battery capable of withstanding extreme temperatures is advantageous for a communications provider in industrial applications. One reason for this is that in most wireless telecommunication networks, a base transceiver station (BTS) is located at or near an outdoor communications tower. Because of this, it is important that the modular unit be able to endure a wide range of weather and temperature changes.

Further, LMP batteries may be used by a provider in an enclosure having no air-conditioning. They are also smaller than conventional batteries. These factors result in saved space and costs.

Another advantage of using LMP batteries within a communications network is that they are environmentally friendly and noncorrosive. This allows a provider to house the batteries in cabinets or other enclosures without venting. Venting is unnecessary because the LMP batteries do not emit gases (hydrogen and other toxins) that are harmful to breathe or are flammable.

Another benefit of LMP batteries is that they exhibit a long life span (greater than 10 years) and a slow-linear aging characteristic. This provides the communication provider with greater reliability, and enables them to accurately predict battery replacement intervals.

Additionally, LMP batteries may be disconnected and put into sleep mode. Sleep mode is a state in which the LMP is temporarily taken off line until it is later called back into duty. This avoids drain which would otherwise require periodic recharging.

Another distinct advantage of the LMP battery is the ability to locally or remotely monitor the battery status either from an LED source located on the battery, or via a link-cable connected to the provider's computer, communications network, or alarm system. Determining when a battery is nonfunctional is a time-saving tool for providers and technicians performing preventive maintenance measures. A visible LED source located on the battery provides an easily viewed indication of the batteries state of health. Furthermore, in the preferred embodiment, these batteries are smart devices, which enable them to notify a systems administrator over a computer network of failures.

The LMP batteries used in the preferred embodiment are 48-volt, 63 amp-hour batteries manufactured by Avestor, Inc. (Model No. SE 48S63), but the scope of the invention is not to be limited to any particular manufacturer or amp-hour/voltage level used. Six batteries are used in the present embodiment (see FIG. 1), but more or less could be used for particular load requirements.

With respect to their bridging functions, the LMP batteries 104 provide electrical power during the time it takes to switch from the reformer-supplied fuel cell in the primary power supply 102 to backup supply fuel cell 104. The LMPs 128 are electrically connected in parallel on a bus 130 which is then electrically connected into main DC bus 132. If the reformer 112 runs out of fuel or is otherwise inoperable, the LMPs 128 will immediately pick up the load temporarily in a bridging capacity. The LMPs will also be called to bridge for the time it takes for the control system to i.e., (i) switch between fuel sources (e.g., natural gas 108 and propane 110), (ii) deliver natural gas or propane to reformer 112, (iii) cause hydrogen to be produced and then be delivered to one of fuel cells 114 or 116 from reformer 112, or (iv) produce hydrogen by releasing it from an encapsulating medium in backup fuel source 139 and then deliver the hydrogen to backup fuel cell 104 to produce DC power. The LMPs are easily able to accommodate the longest of these possible delays. Another function of the LMPs is that they help smooth out the DC output of the primary power supply 102. The electrical output of whatever fuel cell is in use (114 or 116) fluctuates slightly. To make this DC output consistent, the LMPs fill in for any dips in power maintaining a constant output level.

The LMPs 128 also act as a last-resort backup power source. If both primary power supply 102 and backup power supply 104 are out of service for some reason, the LMPs will act as a backup source for a certain amount of time until one of the other supplies is again operational.

Backup supply 104, in the disclosed embodiment, is a fuel cell similar to fuel cells 114 and 116 included in the primary source. In the FIG. 1 arrangement, fuel cell 104 is fueled by a backup fuel source 139. In the disclosed embodiment, backup source 139 comprises a hydrogen generation and delivery system. More specifically, fuel cell 104 receives gaseous hydrogen via a conduit 140.

Backup fuel source 139 operates using storage medium 160 which, in the preferred embodiment, comprises a compound which includes hydrogen. In the preferred embodiment, storage medium is a solid. But alternatively, liquid mediums could be used. In the preferred embodiment, sodium borohydride ($NaBH_4$) is the storage medium 160. $NaBH_4$ can be embodied in liquid or solid form. Both versions are commercially available. In the preferred embodiment, however, solid $NaBH_4$ is used. Though $NaBH_4$ is the storage medium used in the preferred embodiment, other hydrogen storage mediums could be used as well. For example, the hydrogen could alternatively be stored in other chemical compounds, e.g., metal hydrides and powdered magnesium. Carbon nanotubes could be used as well. Other storage mediums could be used as well and fall within the scope of the present invention. For all of these storage mediums, the hydrogen is able to be released on demand.

The hydrogen supply system of source 139 which utilizes a solid storage medium (like solid $NaBH_4$) has numerous advantages over the more conventional techniques using high pressure hydrogen tanks. For one, the entire backup fuel source 139 is locatable in doors if necessary. Where tanks are used, this would be impossible because of safety concerns and industry regulations. These concerns and regulations do not apply to the medium-stored hydrogen supply arrangements disclosed in this application.

The hydrogen is released using a separating system 162. Separating system 162 might include a containment system in which the storage medium 160 is reacted with another substance to release the hydrogen. In the case of $NaBH_4$, the hydrogen is released from the solid medium using a stoichiometric hydrolysis reaction. Sodium borohydride is stable in dry environments, but will undergo hydrolysis when exposed to acidic or neutral water. In the preferred embodiment, an aqueous solution serves as diffusion catalyst 164 in FIG. 1. The exposure occurs in system 162 in, e.g., a containment vessel of some sort (not shown). When the $NaBH_4$ exposed to the aqueous solution, hydrogen gas is released which can be used in as backup fuel source 139. Temperatures can be elevated to enhance or impede the separation process. Thus, diffusion catalyst 164 might also include some means for elevating temperatures in separating system 162.

Other than the vaporous hydrogen, sodium borate and steam will be produced. Sodium borate is easily managed from an ecological standpoint. It is nontoxic, and thus, able be drained to a sewer system. The steam can be removed using a condensation loop. With the water removed, the remainder is pure vaporous hydrogen which may be used as a backup fuel supply.

The processes are similar for separating the hydrogen from other metal hydrides, said processes involving either stoichiometric reactions, temperature manipulations, or both.

The hydrogen-release process for hydrogen encapsulated in carbon nanotubes involves simply elevating temperatures inside separating system 162. Thus, in such an embodiment catalyst 164 would include some means for raising temperatures.

Where glass beads are used as the encapsulating medium the hydrogen is initially stored in these beads by heating them up. When cooled, the beads absorb hydrogen. When reheated (in separating system 162) vaporous hydrogen is then released and may be used as the backup fuel source 139.

Regardless of the means to generate the vaporous hydrogen, when it is released, it is introduced into a hydrogen line 140. Once in line 140, the hydrogen is delivered to a backup power supply 104 which, in the preferred embodiment, is a fuel cell.

Downstream from the backup fuel source 139 in a conduit 140 is a shut off valve 142. Valve 142 must be opened in order for pressurized hydrogen from source 139 to reach fuel cell 104 for consumption. When fuel cell 104 consumes hydrogen, a DC power output 144 is produced and is introduced into DC bus 132. This arrangement makes the fuel-cell-produced DC power available to BTS 106.

Though not shown, the power system of the present invention also comprises a control system which includes a number of sensing and control mechanisms (not shown) for determining which fuel source to activate and which power source to engage. As will be known to one skilled in the art, these kinds of automated systems may be separate devices or may be integral to the valves, bus lines, and/or devices being monitored. Likewise, the control mechanisms may be separate devices, such as programmable logic controllers, or may be integrated into the components already described.

Regardless, these techniques of monitoring and activating equipment will be known to one skilled in the art, and one skilled in the art will know how to arrange these devices such that (i) valves 118 and 120 are opened or closed to select between natural gas and propane, (ii) failure of the primary power supply 102 is detected because of the lack of fuel or some mechanical problem, (iii) a failure in fuel cell 114 is detected prompting a switch to fuel cell 116 by closing valve 124 and opening valve 126, (iv) backup power supply fuel cell 104 will be activated when needed, (v) diffusion catalyst 164 is combined with hydrogen storage medium 160 to generate gaseous hydrogen and then valve 142 opened to supply fuel cell 104, and (iv) other automated requirements are met. Particular arrangements for accomplishing these objectives will be evident to and fall within the abilities of one skilled in the art.

The system also provides a low-voltage AC outlet 150 with an inverter for the purpose of providing the user with AC power, e.g., 120V. To accomplish this, an inverter 148 receives DC power from bus 132 and converts it to useable AC power. Outlet 150 might be used, e.g., for operating power tools or other small electronic devices. Again, the overall system 100 can be located in places not on the AC power grid and when in these locations, outlet 150 enables a user to access 120V AC, because AC from a utility will not otherwise be available.

A power-management flow chart 200 of FIG. 2 shows both the operational aspects of system 100 as well as different contingency plans in terms of energy management in the face of a variety of events. In a first step 202 of the process, an inquiry is made as to whether primary fuel source 107 is available. This step will depend on how the system is initially set up. In situations in which both natural gas and propane are possible fuel sources (e.g., the site is located where utility natural gas is available), the user will typically make a cost assessment as to which fuel is currently desirable. If natural gas is less expensive, and available, that source will be used first. Whether natural gas is available to the system from the utility is detected by a pressure sensor located upstream of valve 118. This pressure sensor will detect whether sufficient pressure exists in the line to drive reformer 112.

If the natural gas then becomes unavailable, the propane (or stored high-pressure natural gas) is used as a fall-back option. With respect to propane, tank 110 will typically comprise a microprocessor-controlled fuel pressure valve and indicator which cooperates with the control system to automatically determine fuel availability.

If system 100 is incorporated into an area where utility natural gas is not available, e.g., in remote locations, propane alone will be the only potential fuel. In this situation, step 202 will ask only whether sufficient propane exists in tank 110 to operate reformer 112.

Regardless, if any fuel in primary fuel source 107 is available (natural gas or propane) the answer to inquiry 202 will be yes, and the process will move on to a step 204.

In step 204, reformer 112 will receive fuel from whatever fuel source is available (108 or 110) and begin the hydrogen-extraction process. If natural gas 108 is the available fuel, valve 118 will open up and natural gas will travel down tube 122 into the reformer intake. If propane is the available fuel, valve 120 will open up and tube 122 will transmit propane to reformer 112. Once reformer 112 receives either fuel, it will begin producing hydrogen gas.

Where the hydrogen is consumed will depend on the answer to an inquiry step 206. Step 206 asks whether fuel cell 114 is available. If fuel cell 114 is functional, and has not been taken out of service for some reason, valve 124 will be open (valve 126 will remain closed) and fuel cell 114 will begin to noncombustibly consume the hydrogen extracted by reformer 112. This creates a DC output in line 126 in a step 208. This DC output is then introduced into bus 132 for consumption by BTS 106 in step 210. This is the normal mode of operation.

If, however, fuel cell 114 is not available for some reason, e.g., fuel cell 114 is being serviced, the process will then move on to a step 212. Step 212 inquires as to whether spare fuel cell 116 is available. If so, valve 124 will be closed and valve 126 opened. This will cause the hydrogen produced by the reformer to be diverted to fuel cell 116, which will begin to noncombustibly consume hydrogen to produce DC power in a step 214. The DC output created by fuel cell 116 is then received into line 126. From there it is introduced into bus 132 for consumption by BTS 106 in step 210.

If, in step 212, spare fuel cell 116 is unavailable like fuel cell 114, or if in step 202 a determination is made that no primary fuel source 107 is available, the process will arrive at a step 216 in which the LMP batteries 128 will temporarily bridge. This means they will drain (for a limited time) to provide the necessary DC to the BTS in step 210.

Next, an inquiry will be made in a step 218 as to whether backup fuel source 139 is available. This determination will be made by the automated control system which determines whether the solid, encapsulated hydrogen 160 is available. If this fuel is available, it will be used to drive backup fuel cell 104. If not, the process moves on to a step 225 in which a determination is made as to whether sufficient charge exists in the LMP batteries provide backup power. Initially the answer will be yes (because the batteries have not yet drained) and the LMPs will provide backup power in a step 227 which the BTS will consume in step 210.

A looping step 226 in the process is shown in FIG. 2 which is continuous. Loop 226 brings the process back to the initial step 202. This continuous looping ensures detection when the primary supply system 102 has returned to service. If the primary systems have not returned to service, LMPs 128 will continue to provide backup in step 227.

If, in step 218, a supply of hydrogen storage medium 160 is available, it along with diffusion catalyst 164 in a step 220 will be introduced into the separating system 162 in order to diffuse and thus extract the hydrogen from the medium. Also in step 220, valve 142 is opened up. It will take some time, typically a matter of seconds, from the time the hydrogen storage medium and catalyst are combined before gaseous hydrogen is present in tube 140 and fuel cell 104 has begun to receive and consume fuel. Until the fuel cell is operational, an inquiry step 222 will direct the process back to step 216 and the LMPs will continue to bridge (unless the primary power supply 102 has been restored). Once fuel cell 104 becomes operational, however, the process proceeds to step 214 where fuel cell 104 consumes the hydrogen produced by backup fuel source 139 and generates DC which will be consumed by the BTS in step 210.

Once operational, fuel cell 104 will continue to generate DC output in step 222 until (i) the supply of hydrogen storage medium 160 runs out or (ii) primary power supply 102 comes back on line. Even though the backup system is operational in step 220, the process continuously checks (via a loop 226) to see if the primary power supply 102 has been restored. If so, the backup power supply 104 will shut down, and the reformer system 102 will be returned to service.

Through these processes, system 100 is able to provide efficient, reliable power in remote locations without significantly affecting the surrounding environs.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A method of providing electrical power to a power-consuming device in a circuit, said method comprising:

providing a primary power supply that comprises a first fuel cell and a spare fuel cell, wherein the primary power supply is configured as a primary source of the electrical power to the power-consuming device;

detecting that neither the first fuel cell nor the spare fuel cell is available;

incorporating an output of a backup fuel cell into said circuit;

providing a backup fuel source to release the hydrogen from a solid storage medium:

releasing said hydrogen from a solid storage medium by a process comprising:
- (a) providing an aqueous solution that serves as a diffusion catalyst;
- (b) introducing the aqueous solution to the solid storage medium within a containment vessel; and
- (c) causing a chemical reaction to occur that extracts the hydrogen from the solid storage medium in vapor form; and noncombustibly consuming said released hydrogen in said backup fuel cell to provide the electrical power to said power-consuming device.

2. The method of claim 1, comprising:

including at least one energy-storage device in said circuit; and eliminating power drops in said circuit using said at least one energy-storage device.

3. The method of claim 2, wherein said including step further comprises:

providing at least one LMP battery to serve as said at least one energy-storage device in said circuit.

4. The method of claim 1, comprising:

executing said releasing step when a primary fuel source that supplies fuel to the primary power source is unavailable.

5. The method of claim 1 wherein said providing step comprises:

selecting a chemical compound to serve as said solid storage medium.

6. The method of claim 1 wherein said providing step comprises:

selecting a metal hydride to serve as said solid storage medium.

7. The method of claim 1 wherein said providing step comprises:

selecting sodium borohydride ($NaBH_4$) to serve as said solid storage medium.

8. A system for maintaining power in a DC circuit, said system comprising:

a primary power supply of DC electrical power comprising a first fuel cell and a spare fuel cell that are adapted to receive fuel from a primary fuel source, convert hydrogen extracted from the fuel into DC electrical power in an alternating manner, and introduce the DC electrical power into said circuit;

a control system for detecting that the first fuel cell and the spare fuel cell are both unavailable, and for activating a backup fuel source that supplies hydrogen gas to a backup fuel cell:

the backup fuel source comprising:
- (a) a solid storage medium in which said hydrogen gas is included;
- (b) an aqueous solution that serves as a diffusion catalyst; and
- (c) a separating system that introduces the aqueous solution to the solid storage medium, thereby creating a chemical reaction that releases said hydrogen gas; and the backup fuel source adapted to noncombustibly consume the hydrogen gas, to generate DC electrical power from the hydrogen gas, and to deliver the DC electrical power to said circuit.

9. A system for providing backup electrical power, said system comprising:

a gas-extraction device for extracting a first source of hydrogen gas from fuel supplied by a primary fuel source;

a first gas-consuming device for noncombustibly using said first source of hydrogen gas to create a first source of electrical power, wherein the first gas-consuming device comprises a first fuel cell and a spare fuel cell that are adapted to convert the hydrogen gas extracted from the fuel into the electrical power in an alternating manner;

a backup fuel source that supplies hydrogen gas to a backup fuel cell upon detecting that the first gas-consuming device is unavailable, the backup fuel source comprising:
- (a) second source of gas included in a solid storage medium;
- (b) an aqueous solution that serves as a diffusion catalyst; and
- (c) a separating system that introduces the aqueous solution to the solid storage medium, thereby creating a chemical reaction that releases said hydrogen gas; and the backup fuel source adapted to noncombustibly consume the hydrogen gas and to generate electrical power from the hydrogen gas.

10. The system of claim 9 wherein said solid storage medium comprises a metal hydride.

11. The system of claim 9 wherein said solid storage medium comprises sodium borohydride ($NaBH_4$).

12. The system of claim 9 wherein said solid storage medium comprises a solid compound.

13. The system of claim 9 comprising: at least one LMP battery for maintaining constant power.

14. The system of claim 9 comprising:

a circuit for receiving both said first and second electrical sources of power; and a power-consuming device included in said circuit.

15. The system of claim 9 wherein said source of fuel is a propane tank and said system is operable independently without contribution from a utility company.

* * * * *

UNITED STATES PATENT AND TRADEMARK OFFICE
CERTIFICATE OF CORRECTION

| | |
|---|---|
| PATENT NO. | : 7,629,707 B2 |
| APPLICATION NO. | : 11/153806 |
| DATED | : December 8, 2009 |
| INVENTOR(S) | : Willets et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Second Day of November, 2010

David J. Kappos
*Director of the United States Patent and Trademark Office*